United States Patent
Balbierer et al.

(10) Patent No.: US 10,116,462 B2
(45) Date of Patent: Oct. 30, 2018

(54) METHOD FOR TRANSMITTING DATA BETWEEN NODES OF A MOTOR VEHICLE USING AN ETHERNET TRANSPORT PROTOCOL AND CONTROL UNIT CONFIGURED TO CARRY OUT SAID METHOD

(71) Applicant: CONTINENTAL AUTOMOTIVE GMBH, Hannover (DE)

(72) Inventors: Norbert Balbierer, Kelheim (DE); Josef Nöbauer, Neukirchen-Balbini (DE); Helge Zinner, Magdeburg (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/400,484

(22) PCT Filed: May 8, 2013

(86) PCT No.: PCT/EP2013/059637
§ 371 (c)(1),
(2) Date: Nov. 11, 2014

(87) PCT Pub. No.: WO2013/167684
PCT Pub. Date: Nov. 14, 2013

(65) Prior Publication Data
US 2015/0143144 A1    May 21, 2015

(30) Foreign Application Priority Data
May 11, 2012    (DE) .......................... 10 2012 207 900

(51) Int. Cl.
*H04L 12/40*    (2006.01)

(52) U.S. Cl.
CPC .. *H04L 12/40039* (2013.01); *H04L 12/40136* (2013.01); *H04L 12/4013* (2013.01); *Y02D 50/10* (2018.01)

(58) Field of Classification Search
CPC ............... H04L 12/40; H04L 12/40136; H04L 12/40039; H04L 47/821; H04L 12/56;
(Continued)

(56) References Cited

U.S. PATENT DOCUMENTS

| 6,731,650 | B1 | 5/2004 | Yamagishi |
| 9,065,673 | B2 | 6/2015 | Diab et al. |

(Continued)

FOREIGN PATENT DOCUMENTS

| CN | 101465779 | 6/2009 |
| EP | 2 073 464 | 6/2009 |

OTHER PUBLICATIONS

Christensen et al., IEEE 802.3az: The Road to Energy Efficient Ethernet, Nov. 2010.*
(Continued)

*Primary Examiner* — Jae Y Lee
*Assistant Examiner* — Aixa Guadalupe-Cruz
(74) *Attorney, Agent, or Firm* — Cozen O'Connor

(57) ABSTRACT

A method for transmitting data in a motor vehicle from an application using an Ethernet transport protocol between nodes of the motor vehicle includes: the application transmitting data via an Ethernet-based network at cyclic intervals; deactivating local transmitters and receivers of a node in non-use periods, in which no data need to be transmitted; activating again the local transmitters and receivers of the node when data are pending transmission; transferring the local transmitters and receivers from an operating active mode to a quiescent mode in a deactivation time; transferring the local transmitters and receivers from the quiescent mode to the operating active mode in an activation time; and the application lowering the transmission frequency at least (Continued)

until a prescribed limit value is reached based at least in part on a requirement to save energy.

10 Claims, 2 Drawing Sheets

(58) Field of Classification Search
CPC ..... H04L 5/16; H04L 5/1423; H04L 12/1881; H04L 12/12; H04L 12/4013; H04N 7/18
See application file for complete search history.

(56) References Cited

U.S. PATENT DOCUMENTS

| | | |
|---|---|---|
| 2009/0152943 A1 | 6/2009 | Diab et al. |
| 2009/0158360 A1* | 6/2009 | Diab ................ H04L 12/40 725/75 |
| 2009/0158377 A1 | 6/2009 | Diab et al. |
| 2009/0204827 A1 | 8/2009 | Diab et al. |
| 2010/0023658 A1 | 1/2010 | Diab et al. |
| 2011/0090914 A1 | 4/2011 | Diab et al. |
| 2011/0261814 A1* | 10/2011 | Matthews ........ H04L 47/6215 370/389 |
| 2012/0287829 A1* | 11/2012 | Chang ................ H04L 5/16 370/296 |

OTHER PUBLICATIONS

Chiasserini et al. "Energy Consumption and Image Quality in Wireless Video-Surveillance Networks", Sep. 15, 2002, pp. 2357-2361.

Christensen et al. "IEEE 802.3az: The Road to Energy Efficient Ethernet", Nov. 1, 2010, pp. 50-56.

Liu et al. "Communication Speed Selection for Embedded Systems with Networked Voltage-Scalable Processors", Jan. 1, 2002, pp. 169-174.

Maier et al. "A Hierarchical Approach for Energy-Aware Distributed Embedded Intelligent Video Surveillance", Jul. 20-22, 2005, 5 pages.

Manderscheid et al. "Network Calculus for the Validation of Automotive Ethernet In-Vehicle Network Configurations", Oct. 10, 2011, pp. 206-211.

Rath et al. "A Two Wire Power Over Ethernet Approach for In-Vehicle Applications", Jul. 7, 2011, 5 pages.

Office Action dated Nov. 4, 2016 which issued in the corresponding Chinese Patent Application No. 201380024571.2.

* cited by examiner

METHOD FOR TRANSMITTING DATA BETWEEN NODES OF A MOTOR VEHICLE USING AN ETHERNET TRANSPORT PROTOCOL AND CONTROL UNIT CONFIGURED TO CARRY OUT SAID METHOD

CROSS-REFERENCE TO RELATED APPLICATIONS

This is a U.S. national stage of application No. PCT/EP2013/059637, filed on 8 May 2013, which claims priority to the German Application No. DE 10 2012 207 900.9 filed 11 May 2012, the content of both incorporated herein by reference.

BACKGROUND OF THE INVENTION

1. Field of the Invention

The invention relates to a method for transmitting data in a motor vehicle from an application using an Ethernet transport protocol. In particular, the data are time-critical streaming data that have particular QoS (Quality of Service) requirements that are also prescribed, in particular by a fixed transmission frequency, defined according to standard, and a maximum permitted transmission time, which can be determined by the application. A typical instance of application for such data is audio and/or video data, or else control data that are transmitted in a form encapsulated into data packets within the context of an Ethernet protocol.

2. Related Art

The transmission of the data between nodes of a motor vehicle, which may be particularly (at least to some extent also) in the form of controllers of the motor vehicle, for example in the form of multimedia controllers, takes place particularly on the basis of the Ethernet AVB transport protocol provided for such streaming data. The encapsulated content (data) is in this case transmitted preferably together with supplementary information, for example about the sampling rate, the number of audio channels, the video format and the resolution thereof and/or the compression of the data. This is implemented by the IEEE 1722 standard.

When data are transmitted by this Ethernet transport protocol, provision is made for the data to be transmitted via an Ethernet-based network at cyclic intervals. The method also provides for the local transmitters and receivers (PHY) of a node, usually in the form of transceivers, to be deactivated in non-use periods, in which no data need to be transmitted, and to be activated again when data are pending transmission, wherein the local transmitters and receivers (PHY) are transferred from an operating mode (active) to a quiescent mode (LPI) in a deactivation time ($T_S$) and are transferred from the quiescent mode to an operating mode in an activation time ($T_W$).

The minimum cycle time ($T_{CT}$) is thus obtained from the sum of the active transmission time for the data, also called frame transmission time ($T_{FRM}$), and the changeover times, i.e., the deactivation time ($T_S$) and the activation time ($T_W$). In order to be able to save power, the cycle time must thus be longer than the minimum cycle time ($T_{CT}$) so that the local transmitters and receivers are in the quiescent mode for a certain period. The local transmitters and receivers of a node, which are also called PHY devices and accomplish particularly the bit-by-bit data transmission in the physical layer, are thus deactivated in non-use periods, in which no data need to be transmitted, and activated again when data are pending transmission in a transmission frame (MAC frame) of an upstream layer, particularly what is known as the MAC layer.

Besides the typical bus systems in the automotive field, such as CAN bus, FlexRay or the like, a bus system operating on the basis of an Ethernet transport protocol is also increasingly finding its way into the motor vehicle. The Ethernet, i.e., a network that operates on the basis of the Ethernet transport protocol, and is usually wired, has a high bandwidth, is highly flexible and has worldwide standardization. Therefore, the Ethernet will also be an important system interface for a motor vehicle in the coming years.

The increasing electrification of motor vehicles also means an increasing rise in the power consumption thereof. This in turn results in increased fuel consumption, which also has a direct effect on the end user in terms of cost. In addition, taxation on a motor vehicle is today calculated on the basis of $CO_2$ (carbon dioxide) emissions, which can in turn be derived from the energy consumption in terms of fuel. The range of an electrically operated vehicle is also coupled to the capacity of the battery and hence to the power requirement of the loads connected in the motor vehicle.

During standard network operation, the local transmitters and receivers (PHY devices), which are also called Ethernet transceivers, have a constant power requirement that is independent of the utilization level of the connection in the data transmission, since what are known as IDLE code groups are sent when no useful data need to be transmitted via the data connection. This power consumption exists during the changeover phases for activating and/or deactivating the PHY devices.

A new IEEE 802.3az standard (also called Energy Efficient Ethernet—EEE) provides the previously described expansions in order to deactivate the transmission of IDLE code groups in the local transmitters and the local receivers on the other side of the communication connections during the periods without useful data transmission instead of continuing to send the IDLE code groups. This deactivation is also called Low Power Idle—LPI (energy saving mode or quiescent mode). This allows the power requirement to be reduced in the physical layer, which physically produces the actual data transmission.

The aforementioned standard also stipulates the minimum transmission time between the normal state of the Ethernet transceiver, in which data transmission can take place, and the deactivated mode (LPI). In this case, the time for waking or activating a transmitter and/or receiver from the energy saving mode (LPI) is specified at $T_W=30$ µs. In addition, a changeover time is stipulated that is needed in order to transfer the local transmitter and/or receiver to a quiescent mode (LPI state). This deactivation time $T_s$ is $T_s=200$ µs according to the provided standard. The activation time $T_w$ and the deactivation time $T_s$ are the minimum values according to the standard and cannot be reduced, in order to remain compliant with the standard. Compliance with the standard is necessary in order to achieve a universal communication capability among the devices.

In order to save energy from an Ethernet AVB connection (Ethernet Audio Video Bridging), US 2011/0090914 A1 proposes a method in which an energy-efficient network (EEN—Energy Efficient Networking) is negotiated. In this case, the MAC controllers and the PHY transceivers negotiate a data rate for the connection, with a lower data rate reducing the power consumed by the transceivers. In order to maintain the connection and to avoid complex tuning of the PHY transceivers among one another (training), time windows of the Ethernet AVB connection are regularly used in order to update configuration parameters and/or training information. The disadvantage in this case, however, is that the data rate needs to be known beforehand in order to afford an appropriate setting option.

EP 2 073 464 A1 discloses a method in which the PHY transceivers transmit data on different data channels. When the data packet traffic is relinquished, some channels can be shut down or reset to an idle mode with relatively low energy consumption, the proposal being made that one or more of the quiet channels be used for transmitting control signals.

A further aspect of energy saving is described by US 2009/0158377 A1, which describes data transmission on the basis of the Ethernet AVB transfer protocol, the Ethernet cable connection being used to achieve not only the data transmission but also a supply of energy to the reception devices that process the received data further. Since the energy requirement of the reception devices for the further processing of the data is also dependent on the volume of the received data and hence on the transmission frequency of the data packets, inter alia, it is proposed that the energy provided via the Ethernet cable be made dependent on the transmission frequency, for example. The energy requirement for the actual communication engineering is not reduced thereby, however.

Before the method proposed in accordance with the invention is described in more detail, the general mechanism of data transmission on the basis of an Ethernet transport protocol will be explained briefly for the purposes of comprehension.

In an Ethernet network, the transceivers (Ethernet transceivers, PHY devices) in a first protocol layer (PHY layer), also called physical layer, allow the actual communication between connected network subscribers by physically sending and receiving the data packets. The connection control is performed in a second protocol layer (MAC layer, media access control layer, which is upstream of the first protocol layer), also called data link layer, by MAC controllers. The MAC controllers of the second protocol layer form transmission frames (MAC frames), in which the actual data are then compiled on a bit-by-bit basis and transmitted to the actual data transmission to the PHY layer. Data transmission takes place only when a transmission frame (MAC frame) in the second, protocol layer is pending transmission. In order to maintain the data connection, IDLE packets or IDLE code groups are sent when there are no data pending transmission. The actual applications, for example in controllers, are then found in protocol layers further upstream of the second protocol layer.

The Ethernet AVB transport protocol IEEE 1722 is increasingly becoming of interest in use in motor vehicles. This protocol sends data via an Ethernet-based network at cyclic intervals. Before the actual sending of the data, the required resources, for example the bandwidth and/or the transmission rate from the local transmitter to the local receiver, are reserved. In particular, this can also be performed with the dedicated MSRP protocol (Multiple Stream Reservation Protocol), which is part of the AVB standard 802.1Qat. This propagates the transmission cycle, inter alia. Typical transmission rates are 125 µs or 250 µs, which is significantly shorter than the minimum cycle comprising activation time $T_w$ and deactivation time $T_s$. Within the context of this AVB standard 802.1Qat, energy saving by the energy efficient Ethernet (EEE), in the transmission direction of the full-duplex Ethernet connection, is therefore not possible.

Traffic shaping is a further function of the Ethernet AVB standard implemented by the Q802.3Qav standard. Traffic shaping affords the opportunity to control the flow of data from a node of the network, with a particular transmission rate and/or bandwidth being set. The basic idea of traffic shaping is to delay data packets arriving too quickly from the upper protocol layers in order to initiate uniform transmission to the physical transmission devices of the physical layer. This reservation message and the parameters contained therein set and adjust the traffic shaper of the respective output ports.

Since the typical transmission rate is higher than the minimum transmission cycle comprising activation time $T_w$ and deactivation time $T_s$ in this mode too, however, it is not possible to save any power or any energy in this mode. Instead, the data packets are merely delayed. The realtime response of the Ethernet AVB standard is thus adversely affected by energy efficient Ethernet (EEE).

The underlying problem is the activation time $T_w$ that is always needed when leaving the deactivated state of the local transmitters and/or receivers in order to activate the local transmitters and receivers. According to the proposed standard, a local transmitter and/or receiver leaves the deactivated state only when a transmission frame (MAC frame) in which data are intended to be transmitted is available. Since the upper (upstream) layers of the data transmission protocol (communication model) are largely decoupled from the physical data transmission, it is thus always possible for a delay in the activation time $T_w$ in the order of 30 µs to arise, for example in order to activate the local transmitter. It is then necessary for a transmission frame to wait, and said transmission frame is delayed by this time.

SUMMARY OF THE INVENTION

It is an object of the present invention to implement a power or energy saving mode in accordance with a prescribed requirement to save energy without there being any uncontrolled delays in the data transmission and hence losses of quality of service (QoS).

The invention achieves this object for a method of the type cited at the outset by making provision for a requirement to save energy to prompt the application to lower the transmission frequency of which the application transmits the cards at least until a prescribed limit value is reached. That is to say that, according to an aspect of the invention, the transmission cycle for the data is increased and hence the data transmission is slowed down. Since the data transmitted by the application are particularly streaming data, which, unlike pure status information or non-time-critical data transmissions, must arrive at the desired receiver of the data within a particular time after transmission by the transmitter of the node associated with the application, the transmission frequency cannot be conditioned arbitrarily, for example by extending the quiescent or energy saving mode. Frequently, however, applications are designed such that the data to be transmitted, and particularly streaming data, are transmitted as quickly as possible, i.e., at a maximum feasible transmission frequency, so that even in the case of unforeseen delays on the communication path, for example, the data are with the receiver in such timely fashion that the end user cannot identify any losses of quality in the application.

In applications in motor vehicles, particularly in motor vehicles driven by an electric motor, power saving during network communication can involve the transmission frequency being decreased from the maximum transmission frequency in favor of a quiescent or energy state until firstly the data for the application still arrive at the receiver in good time and secondly a quiescent or energy saving mode of the transceivers (Ethernet transceivers) of the network nodes involved can be observed, however.

The dynamic conditioning of the transmission response in accordance with an aspect of the invention, particularly by setting the transmission frequency, but possibly also—as will be described later—by conditioning the content of the data that are to be transmitted, achieves variable energy and power saving that can be flexibly matched to the also quantitatively prescribed requirement for saving energy. Since the transmission time is known in light of the activation and deactivation times of the transmitters and receivers (PHY devices of the physical layer), unintentional delays in the transmission can be prevented by the activation time $T_w$, since activation of the transmitters and/or receivers of the nodes involved is also taken into account for determining the cycle time, or the transmission frequency. Thus, undesirable jitter and undesirable delay of the data do not arise. The result of this is that, according an aspect of to the invention, the guaranteed quality of service (QoS) prescribed by the application can be observed by lowering the lowering of the transmission frequency until a prescribed limit value is reached. In a simple embodiment, this limit value may be firmly prescribed, possibly on the basis of the specific application.

In a preferred embodiment of the proposed method, however, provision is made for the limit value of the transmission frequency to be defined by the sum of the transmission time ($T_{FRM}$) for the data that is to be transmitted by the application within a transmission cycle, preferably the data that absolutely need to be transmitted in order for the application to work, of the deactivation time ($T_s$) and of the activation time ($T_w$). The limit value of the transmission frequency is precisely the inverse of the sum of these aforementioned times that absolutely need to be observed as a minimum cycle time when an energy efficient Ethernet is applied in order to allow the data to be transmitted without delay and hence in a manner that can be predicted for the application.

In this case, the transmission cycle is defined generally as the time from one data transmission to a subsequent data transmission, that is to say at that time in which the application receives and transmits cycle new data. Specifications for the transmission cycle can be obtained from the type of the application (audio and/or video data, security applications or the like). The transmission cycle on the network itself is stipulated by the transmission protocol in the case of IEEE 1722 and IEEE 1733.

So long as this limit value of the transmission frequency is observed, the transmission cycle can be extended by inserting a quiescent mode, in which the transmitters and/or receivers of the nodes involved in the data transmission are not supplied with energy. This results in an energy saving in comparison with a transmission cycle of the same duration in which the transmitters and/or receivers of the nodes involved in the data transmission are continually active, for example in order to be able to transmit data arising at any time.

According to a preferred embodiment of the method proposed in accordance with the invention, the requirement to save energy can be prescribed to the application quantitatively, the quantitative statement relating to the present energy used for the transmission. The requirement to save the energy can be prescribed particularly as a percentage of the energy currently used for the transmission.

Following receipt of a requirement, which can be transmitted either externally to the application or internally, cyclically, by the application itself, the application uses the duration of the present operating mode, i.e., the active time of the transmitters and/or receivers of the nodes involved in the communication, the duration of the activation time and the duration of the deactivation time with the respective energy consumption that is known during these times (which may also be the same during the operating mode, the activation time and the deactivation time), and uses the duration of the present quiescent mode for the known energy consumption, which may also be zero, in particular, to ascertain the necessary extension of the duration of the quiescent mode in order to meet the quantitative requirement to save energy, which is prescribed as a percentage, in particular.

According to an aspect of the invention, the application can then compare the ascertained, necessary extension with the prescribed limit value and reduce the transmission frequency by the ascertained value in line with the ascertained extension of the duration of the quiescent or energy saving mode, so long as this limit value has not been reached. Otherwise, it is possible for there to be at least a reduction as far as the prescribed limit value, with the application then—at least in the case of an external requirement to save energy—being able to output a data message indicating that energy saving to the desired extent cannot be achieved or cannot be achieved without loss of quality in the transmission of the data. From this it is possible for an energy manager of the motor vehicle, which energy manager has output the requirement to save energy, to react and, by way of example, to prescribe a degree of need for the energy saving, which allows the application to ascertain a degree of tolerable losses of quality. Such a degree of need for an energy saving can naturally also be transmitted immediately at the same time as the first requirement to save energy.

According to a particularly preferred embodiment of the proposed method, the application can then check whether the requirements of the application for a minimum transmission cycle, i.e., the time in which the receiver expects the data, and/or for the content of the data that are to be transmitted can be reduced. In this context, different losses of quality can be accepted in line with the importance of the energy saving that needs to be achieved.

A high need for energy saving arises in the case of vehicles driven by an electric motor, for example, when the stored energy draws to an end and in order to increase the range of the energy consumption that is not used for driving the vehicle must or needs to be greatly reduced.

The extension of the minimum transmission cycle leads, in accordance with the aforementioned definition, to a reduction in the limit value for lowering the transmission frequency, so that a relatively long quiescent mode for the transmitters and/or receivers involved in the communication can be achieved.

Alternatively, it is also possible for the volume of data that is to be transmitted to be reduced and therefore the transmission time or the duration of the active operating mode of the transmitters and/or receivers in favor of a quiescent mode of the transmitters and/or receivers. The reduction in the volume of data that is to be transmitted entails losses of quality for the application. In the case of audio or video data, for example, the resolution can be reduced. In the case of other information, the density of information can be decreased, i.e., delayed transmission of the individual information items can take place, for example by virtue of cyclic transmission of the information items that are to be transmitted instead of transmission of all the data at once.

Correspondingly, according to a particular embodiment of the proposed method, the video quality of a data stream that is to be transmitted can be reduced in the case of video data, for example by using a different Codec, by reducing the frames to be transmitted per second and/or by virtue of a lower resolution of the data.

Correspondingly, according to another embodiment, which can naturally also be combined with the transmission of the video data, the invention allows the audio quality of a data stream that is to be transmitted to be reduced in the case of audio data, for example by using a different Codec, by reducing the number of channels and/or by virtue of a lower resolution for the data that would need to be transmitted. By way of example, instead of true surround sound with six data channels, it is possible for just virtual surround sound with two data channels to be transmitted. Changeover from stereo data transmission to mono data transmission is also conceivable in order to reduce the number of channels further. The core content of the video and/or audio data is nevertheless retained, which means that the user willingly accepts certain losses of quality in favor of an increased range for his motor vehicle, for example. The invention allows such losses of quality to be controlled particularly easily by the application itself.

A quite essentially inventive aspect of a preferred embodiment of the present invention thus involves the transmission frequency being initiated by the respective application in question that prompts the data transmission, so that the energy saving is transferred from a level with superiority in the system to an application level that is relatively easy to set and is possibly also parameterizable by the user. Even without the option of parameterization by the user, such a process provides the manufacturer and provider of applications with the opportunity to involve the latter in accordance with his notions of saving electrical energy in the motor vehicle.

Within the context of the application of the method proposed according to the invention, the content of the data that is to be transmitted can be reduced preferably only when the quantitative requirement to save energy is not possible without exceeding the limit value. Thus, before the content of the data that is to be transmitted is implemented by extending the transmission frequency and/or reducing the data, the invention allows there to be provision for appropriate checking of the limit value.

In order to permanently involve the application in energy saving, the invention may also have provision for the transmission frequency to be conditioned cyclically and/or, in the event of a change in the volume of data to be transmitted from the application, automatically, with particularly a maximum energy saving being achieved or being made to be achieved. In this case, the requirement to save energy comes internally from the application itself, with a maximum possible energy saving being able to be targeted in each case. A maximum energy saving in this sense can also mean that a prescribable transmission time reserve is also included in the calculations, based on the volume of data that is currently to be transmitted, so that the application remains flexible. The maximum energy saving can thus be prescribed by the application itself in this case.

According to another aspect, the invention also relates to a controller having a computation unit, wherein the controller, as a node of a network in a vehicle, communicates with another node and in so doing transmits data from an application. The computation unit is set up by program code configured to transmit data using an Ethernet transport protocol between nodes of the vehicle. According to an aspect of the invention, provision is made for the computation unit also to be set up by program code for carrying out the previously described method or portions thereof.

Correspondingly, the invention also relates to a non-transitory computer readable medium storing program code suited to setting up a computation unit for carrying out the previously described method or portions thereof when the program code is executed on the computation unit.

DETAILED DESCRIPTION OF THE PRESENTLY PREFERRED EMBODIMENTS

Figure 1:
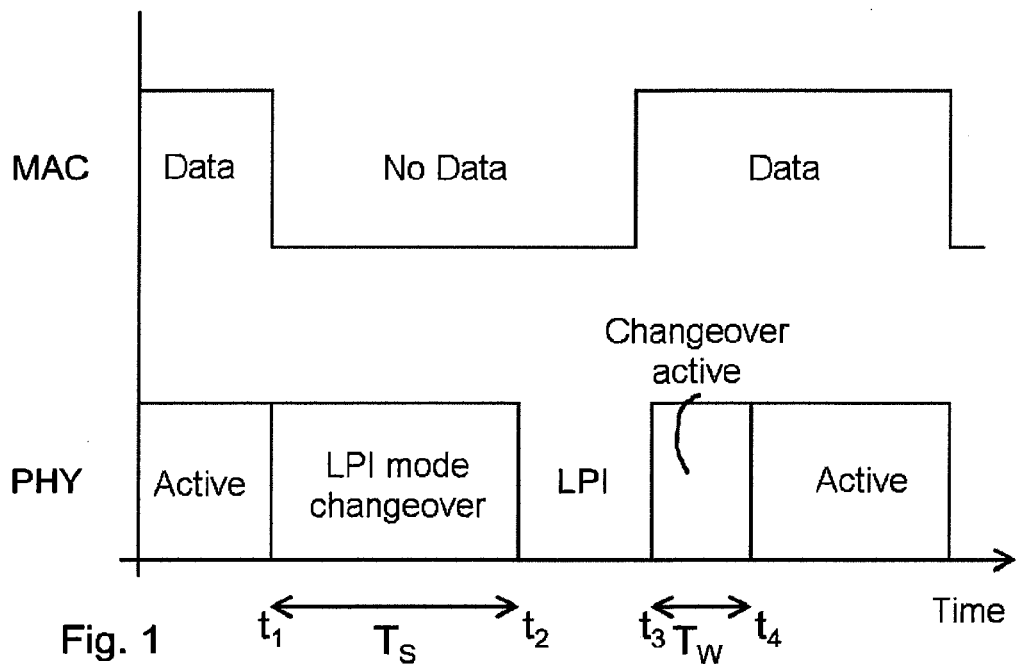
FIG. 1 shows the normal flow of data transmission according to an Ethernet AVB transport protocol using the energy efficient Ethernet in a first implementation of the invention.

FIG. 1 shows the normal interval of time between the state changes between the energy saving mode (LPI) and the normal or operating state (active) of the local transmitters and receivers (PHY devices) in the physical layer (PHY) and the associated timing of the transmission frames (MAC frames) in the MAC layer.

While data for transmission are put into a transmission frame in the MAC layer, this being represented by a high state in the MAC layer with the identification "data", i.e., an active transmission frame (MAC frame), the transmitter (PHY) of the physical layer is active and transmits these data from the transmission frame.

At the instant $t_1$, the data pending in the MAC layer has been transmitted completely, and up to the instant $t_3$ no further data are pending transmission. Within the context of the energy efficient Ethernet, the Ethernet transceiver (PHY)—in the case of a sending node, that is to say with its transmission function—changes over to an energy saving mode (LPI mode, Low Power Idle). For this, the IEEE 802.3az standard provides it with a deactivation time $T_s$ of 200 µs, so that the Ethernet transceiver PHY reaches the energy saving or quiescent mode (LPI), in which the Ethernet transceiver PHY is deactivated, at the instant $t_2$.

Subsequently, the Ethernet transceiver PHY is in its quiescent mode (LPI) until, at the instant $t_3$, new data are put into a transmission frame (MAC frame) in the MAC layer. At this instant, the ether transceiver (PHY, transceiver) begins changeover to the active normal state, which, according to the IEEE 802.3az standard for the energy efficient Ethernet, has been reached after activation time $T_w$ of 30 µs at the instant $t_4$. Subsequently, the data that are pending in the MAC layer and that have been put into the transmission frame (MAC frame) are transmitted by the active Ethernet transceiver (PHY). The data pending transmission in the MAC layer must thus wait in the transmission frame for the activation time $T_w$ until transmission takes place. This results in a delay in the transmission of 30 µs.

FIG. 1 shows the state according to the existing IEEE 802.3az Standard for the Energy Efficient Ethernet (EEE), in which the invention can also be implemented.

Figure 2:
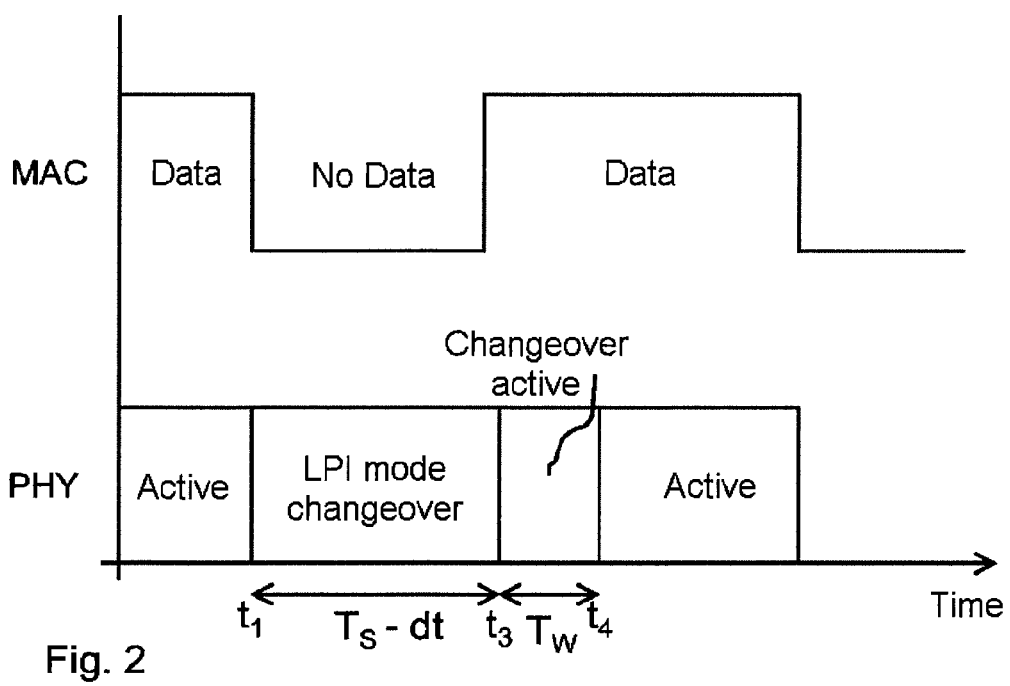
FIG. 2 shows the normal flow of data transmission according to an Ethernet AVB transport protocol using the energy efficient Ethernet in a second implementation of the invention.

FIG. 2 shows a similar change of state according to the IEEE 802.3az standard for the Energy Efficient Ethernet, in which an Ethernet transceiver (PHY) in the physical layer changes from an active normal state to an energy saving mode (deactivated state), which is called the LPI state. In this case too, the Ethernet transceiver PHY begins to change over to the energy saving mode following completed transmission of the data in the transmission frame of the MAC layer at the instant $t_1$. Before the energy saving mode is reached after the deactivation time $T_s$, however, data are again pending transmission in the MAC layer, so that they are put into a transmission frame (MAC frame). The changeover to the energy saving mode (LPI mode) is therefore terminated at the instant $T_s$-dt and the activation process for the Ethernet transceiver PHY is begun again at the instant $t_3$ when data are put into the transmission frame of the MAC layer.

Regardless of whether the energy saving mode (deactivated state) of the Ethernet transceiver PHY had actually been achieved, the activation time $T_w$ is needed in order to begin transmission of the data pending in the transmission frame of the MAC layer in an active operating state of the Ethernet transceiver (PHY). In the cycle shown in FIG. 2, there is thus no power saving at all, since the energy saving mode of the Ethernet transceiver PHY is not reached. Nevertheless, the transmission of the data entails the delay by the activation time $T_w$, which is 30 µs according to the IEEE 802.3az standard.

Figure 3:
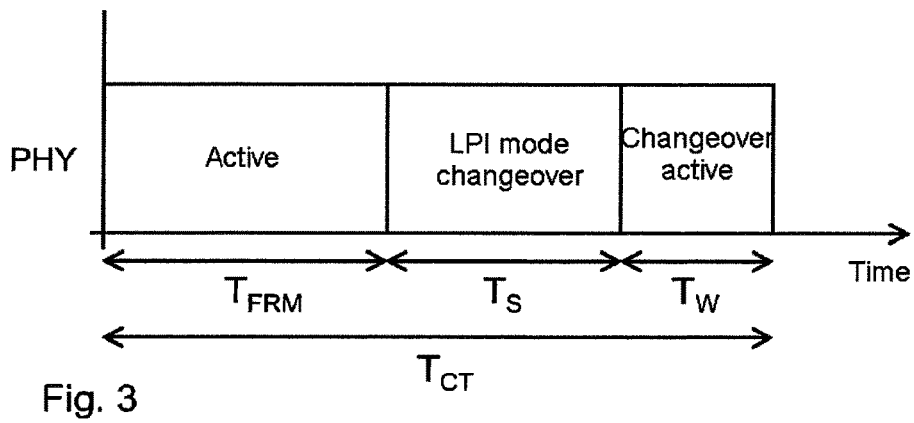
FIG. 3 shows the duration of a minimum transmission cycle $T_{CT}$.

FIG. 3 shows the minimum cycle time $T_{CT}$ that results from the active operating state of the transmitter and/or receiver (PHY device in the physical layer), and that is called the transmission time $T_{RFM}$, this time preferably being the actual transmission time $T_{RFM}$ for the data that necessarily need to be transmitted by the application within the transmission cycle $T_{CT}$. For the minimum transmission cycle $T_{CT}$, there is also the addition of the deactivation time $T_s$ and the activation time $T_W$, which in total form the time for the minimum transmission cycle $T_{CT}$, since the deactivation time $T_S$ and the activation time $T_W$, which are firmly prescribed according to the standards, need to be taken into account so as not to obtain any uncontrolled delays in the data transmission.

This is the starting point of the invention, which, while it is necessary to save power, proposes using the quiescent mode for ongoing data streams too by virtue of the transmission rate being dynamically altered as part of the QoS requirements of the data stream by conditioning the transmission frequency. The cyclic data traffic in the IEEE 1722 protocol allows a prediction, on the subsections between the terminal nodes (transmitters and receivers) and intermediate nodes (switches), of when the data packets can be expected. Dynamic conditioning of the transmission frequency for slowed-down data transmission therefore allows the energy saving mode (LPI state) to be entered without then adding additional latency or jitter (fluctuations in the arrival time) for the data streams. The known times for changing between normal or operating mode and energy saving mode (activation time, deactivation time) allow ascertainment of which transmission frequency can be selected so as not to achieve any additional delays and nevertheless additionally to save power.

By way of example, a specific requirement to save energy can mean saving 10% more power at network level in order to increase the range of an electric vehicle by a certain distance. The transmission frequency of the communication data transmitted according to the IEEE 1722 protocol can be matched to these requirements by the application itself.

However, this is possible without loss of quality only until a limit value is reached, which is defined by the minimum cycle time and is determined by the requirements of the application in terms of the quality of the data to be transmitted, because a particular volume of data needs to be transmitted within the minimum cycle time $T_{CT}$ and this requires a particular duration of the transmission time in the active operating mode. The reason is that it is normally not possible for data to be sent arbitrarily slowly, since the receiver expects and performs further processing on these data in a particular, previously defined time.

It is nevertheless necessary to save power, i.e., the transmitter and/or receiver of the data are transferred to a quiescent mode for a certain time, it is necessary for this upper limit of the transmission cycle to be exceeded. This requires a change in the application requirements in terms of the quality of the data or the quality of service of the data transmission (QoS). According to the invention, this is performed by the application itself by either increasing the transmission cycle time and hence extending the time in which the receiver receives the data and/or reducing the content of the data by decreasing the effective volume of data, which means that sending is terminated more quickly, since the data packets are smaller. The time saved can then be ascribed to the energy saving mode.

Figure 4:
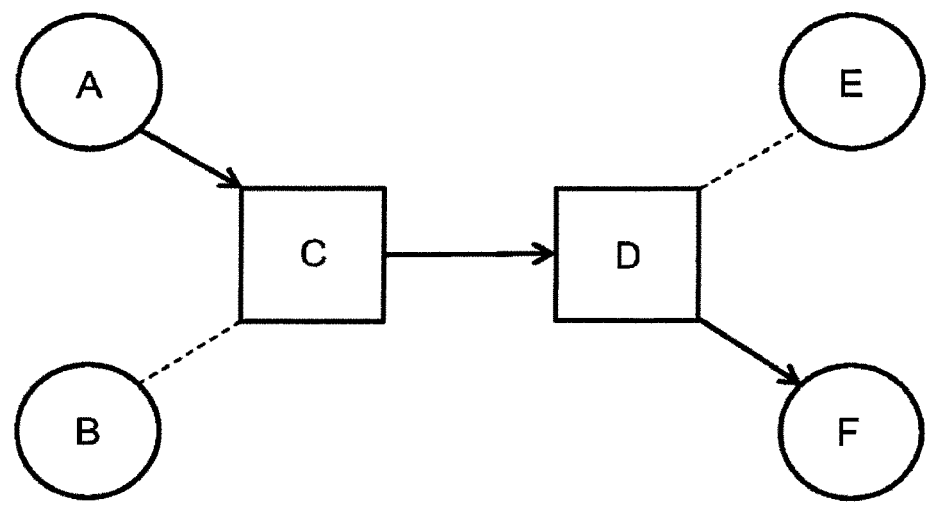
FIG. 4 shows an example of a communication network according to the invention in a motor vehicle having nodes between which communication takes place.

FIG. 4 shows an example of a data stream that runs from the transmission node A of the motor vehicle to the reception node F of the motor vehicle via the intermediate nodes C and D (switches).

This data stream usually has a cycle time of 125 µs, which is so short that no energy can be saved on the connections AC, CD and DF, since the quiescent mode cannot be entered in the cycle time prescribed according to standard.

If there is now the requirement for the communication system nevertheless to save power, this is conveyed to the application. The latter can increase the cycle time of the data stream, for example to a value of $T_{CT}$=300 µs. This means that a data packet is used only every 300 µs. Hence, the PHY devices (transmitters and/or receivers) of the physical layer can change to the quiescent mode in the interim and the energy requirement for the data connection AF as a whole can be reduced, the cost of which is a longer cycle time. This can be realized without losses of quality if need be, however, provided that the specific application allows such a transmission cycle.

A further, if need be even accumulative, way of saving energy involves the system reporting the requirement to save energy during communication to the application that transmits the data. The application can then check whether the content of the data to be transmitted can be altered, this being linked to a decrease in the quality of the data stream.

If this is possible, the following exemplary embodiments are available for the video and audio data transmission, for example.

By way of example, the video quality of a data stream to be transmitted can be achieved by using a different Codec, fewer frames per second and/or a lower resolution. This results in smaller data packets, which can be transmitted in a shorter transmission time. This means that it is thus effectively necessary for fewer data to be transmitted. Since the transmission time for a frame is proportional to the size thereof, the transmission of the pending data is thus concluded all the faster the smaller the transmission frame (frame) is.

A further case of application is the alteration of an audio data stream, which can also involve the use of a different Codec, fewer channels, a lower resolution and/or virtual surround sound with two channels instead of true surround sound with six channels. If a plurality of channels are transmitted (stereo, multichannel), the application can save channels and hence data without the core content being lost.

Figure 5:
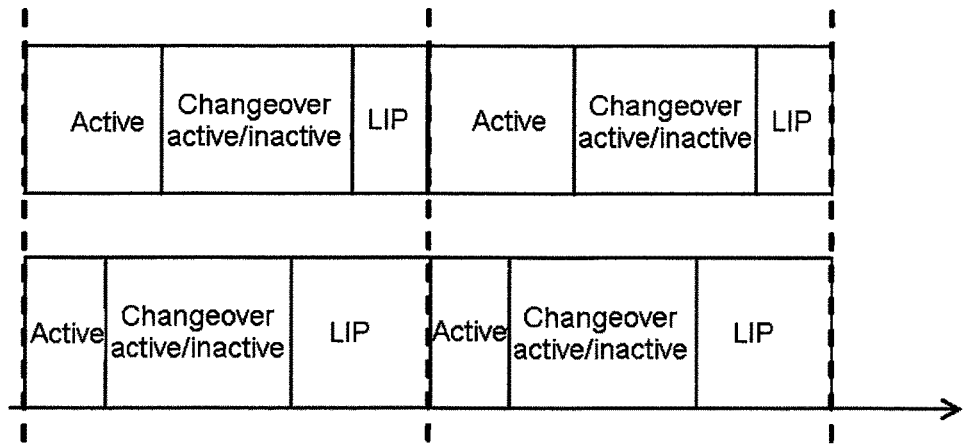
FIG. 5 shows a breakdown of the time split for the various modes within a transmission cycle according to the invention.

The effect of the reduction in the volume of data to be transmitted, as shown schematically in the timing diagram in FIG. 5, is that the time for the active operating mode can be shortened in favor of the quiescent state LPI. The upper bar in FIG. 5 shows the time balance for two successive transmission cycles $T_{CT}$, the quiescent mode LPI being significantly shorter than the active transmission mode for the data that necessarily have to be transmitted.

Following reduction of the volume of data, the data are transmitted in a relatively short time, which means that the active operating state for the data transmission can be extended in favor of the quiescent state, as shown in the lower bar.

The method proposed according to the invention thus allows the invention to make an active contribution, which can be prescribed flexibly by an application, to energy saving in the communication system of the motor vehicle.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for transmitting data in a motor vehicle from an application using an Ethernet transport protocol between nodes of the motor vehicle, comprising:
   transmitting, by the application in a first mode, first data via an Ethernet-based network at first cyclic intervals;
   deactivating transmitters and receivers (PHY) of a node in non-use periods, in which no first data need to be transmitted;
   re-activating the transmitters and receivers (PHY) of the node when first data are pending transmission;
   transferring the local transmitters and receivers (PHY), in a deactivation time (Ts), from an operating active mode to a quiescent mode (LPI);
   transferring the local transmitters and receivers (PHY), in an activation time (Tw), from the quiescent mode (LPI) to the operating active mode;
   the application, upon a request to save energy in a second mode, sending data over the Ethernet-based network in cyclic second intervals;
   extending the cycle time in response to a predetermined energy saving at least until reaching a limit value of the transmission frequency set by the application;
   transmitting data in a correspondingly longer period of use such that the same amount of data is transmitted per unit time within each cycle; and
   using the quiescent mode for ongoing data streams by dynamically changing the transmission rate as part of a QoS requirement of the data stream by adjusting the transmission frequencies.

2. The method as claimed in claim 1, wherein the limit value of the transmission frequency is defined by the sum of a transmission time (TFRM) for the data to be transmitted by the application within a transmission cycle, of the deactivation time ($T_S$) and of the activation time ($T_W$).

3. The method as claimed in claim 1, wherein the requirement to save energy is determined at least in part based on energy currently used for the transmission, wherein a necessary extension of the duration of the quiescent mode (LPI) is ascertained from the duration of the present operating active mode, the duration of the activation time ($T_W$) and the duration of the deactivation time ($T_S$) with a respective known energy consumption and from the duration of the present quiescent mode (LPI) with the known energy consumption.

4. The method as claimed in claim 1, further comprising:
   the application checking whether the requirement for the application can be reduced to a minimum transmission cycle and/or to the content of the data that are to be transmitted.

5. The method as claimed in claim 4, further comprising, in the case of transmission of video data, reducing video quality of a data stream that is to be transmitted.

6. The method as claimed in claim 4, further comprising, in the case of transmission of audio data, reducing audio quality of a data stream that is to be transmitted.

7. The method as claimed in claim 4, wherein the content of the data that are to be transmitted is reduced only if the requirement to save energy is not possible without exceeding the limit value.

8. The method as claimed in claim 1, wherein the transmission frequency is conditioned cyclically and/or, in the event of a change in the volume of data that is to be transmitted, conditioned automatically.

9. A controller having a computation unit that, as a node of a network in a motor vehicle, communicates with another node and in so doing transmits data from an application, wherein the computation unit is configured to execute program code for transmitting data using an Ethernet transport protocol between nodes of a motor vehicle, wherein the computation unit is configured to execute the program code to carry out the method as claimed in claim 1.

10. A non-transitory computer readable medium storing program code that, when executed by a computation unit, causes the computation unit to carry out the method as claimed in claim 1.

* * * * *